(12) United States Patent  (10) Patent No.: US 7,584,335 B2
Daniels  (45) Date of Patent: Sep. 1, 2009

(54) METHODS AND ARRANGEMENTS FOR HYBRID DATA STORAGE

(75) Inventor: Scott L. Daniels, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/555,718

(22) Filed: Nov. 2, 2006

(65) Prior Publication Data

US 2008/0126716 A1  May 29, 2008

(51) Int. Cl.
*G06F 12/00* (2006.01)
(52) U.S. Cl. ............... 711/154; 711/167; 365/230.01
(58) Field of Classification Search .............. 711/154, 711/167; 365/230.01
See application file for complete search history.

(56) References Cited

U.S. PATENT DOCUMENTS

| | | | |
|---|---|---|---|
| 5,615,328 | A | 3/1997 | Hadderman et al. |
| 6,545,932 | B1 | 4/2003 | Sunaga et al. |
| 2001/0040827 | A1* | 11/2001 | Dosaka et al. ......... 365/189.01 |
| 2002/0006071 | A1* | 1/2002 | Ikeda et al. ............ 365/230.03 |
| 2002/0185337 | A1* | 12/2002 | Miura et al. ................... 185/11 |
| 2003/0200408 | A1* | 10/2003 | Mekhiel ...................... 711/167 |
| 2005/0240745 | A1 | 10/2005 | Iyer et al. |
| 2006/0149857 | A1* | 7/2006 | Holman ......................... 710/3 |
| 2007/0288692 | A1* | 12/2007 | Bruce et al. ................. 711/113 |

FOREIGN PATENT DOCUMENTS

| | | |
|---|---|---|
| EP | 0395559 A2 | 10/1990 |
| JP | 11345326 A | 12/1999 |
| JP | 2001283587 A | 10/2001 |

* cited by examiner

*Primary Examiner*—Kevin L Ellis
*Assistant Examiner*—Hashem Farrokh
(74) *Attorney, Agent, or Firm*—Matthew W. Baca; Schubert Osterrieder & Nickelson PLLC

(57) ABSTRACT

Embodiments may comprise a hybrid memory controller to facilitate accesses of more than on type of memory device, referred to generally hereafter as a hybrid memory device or hybrid cache device. The hybrid memory controller may include split logic to determine whether to split data of a write request into more than one portion and to store each portion in a different type of data storage device. For example, one embodiment comprises a hybrid memory controller to store data in both SRAM and DRAM devices. The SRAM and DRAM devices may include distinct circuits on a die, distinct dies within a chip, distinct chips on a memory module, distinct memory modules, or the like.

19 Claims, 6 Drawing Sheets

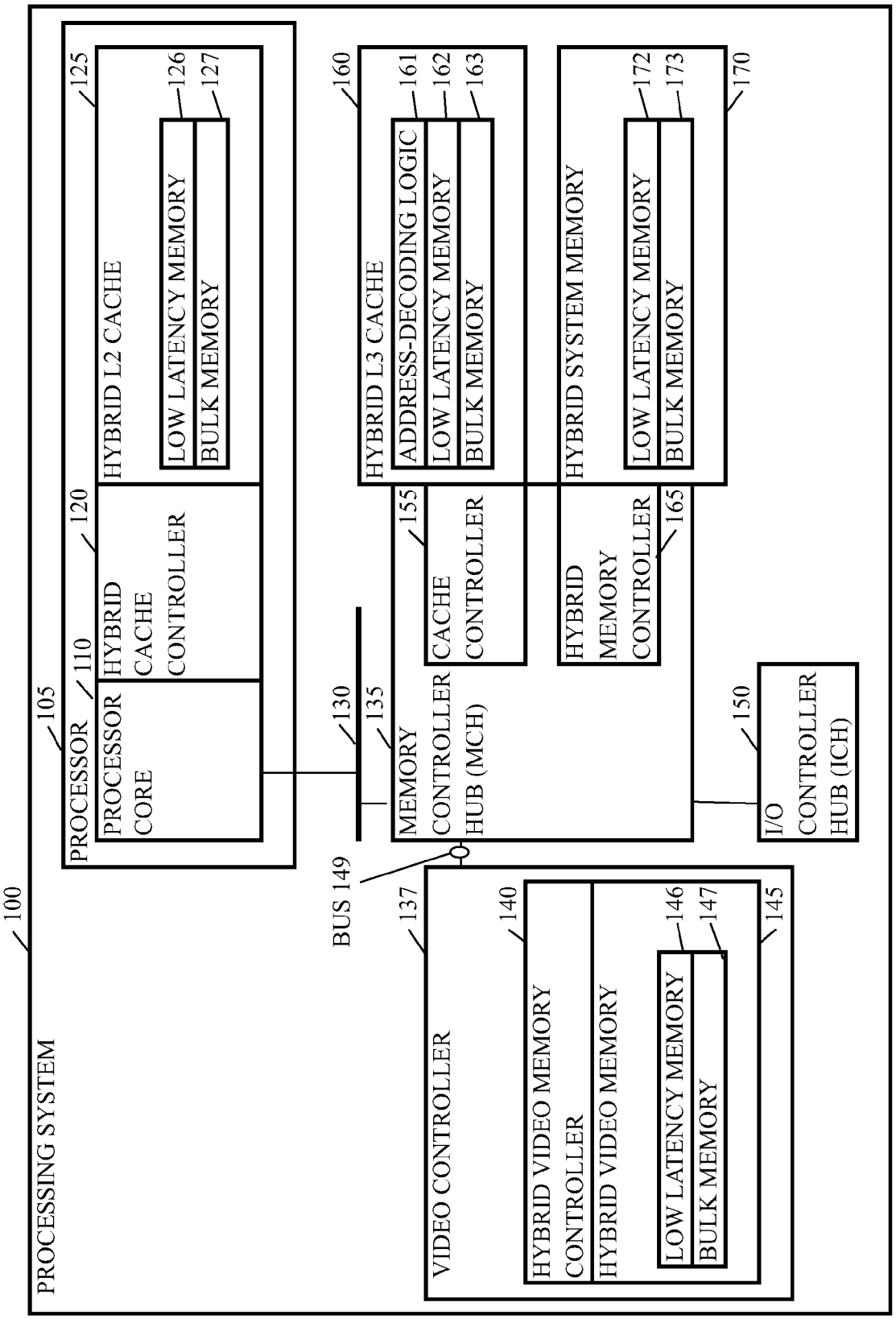

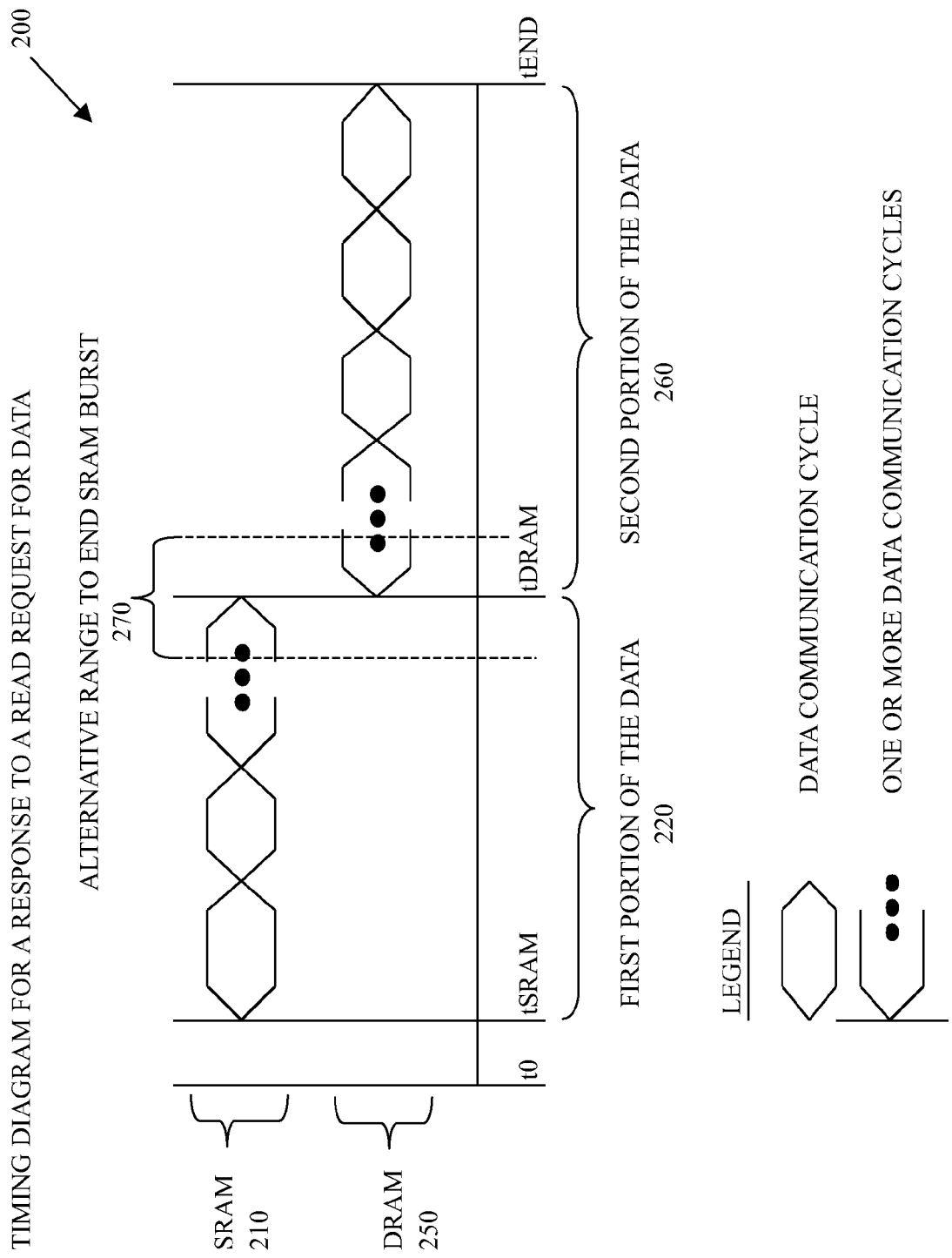

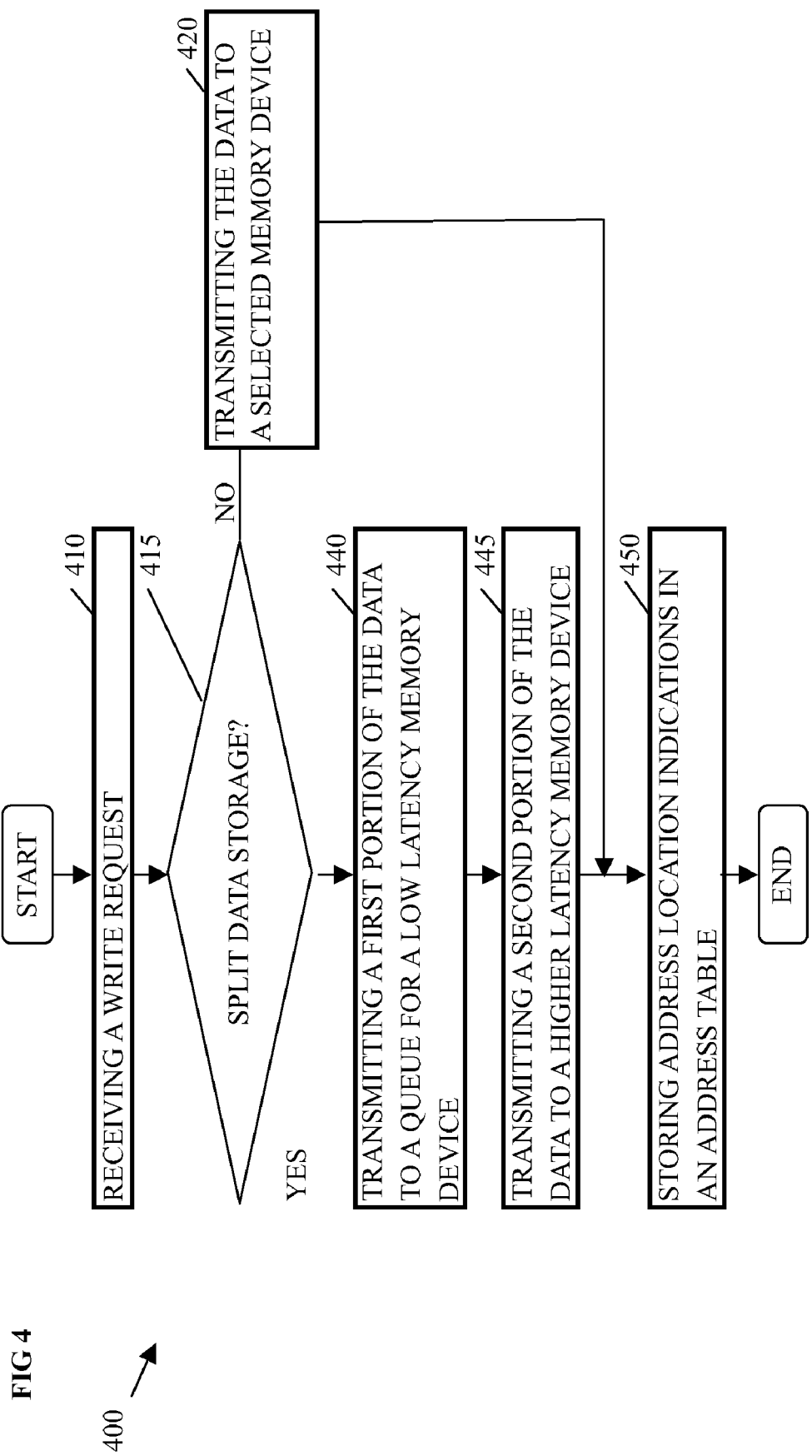

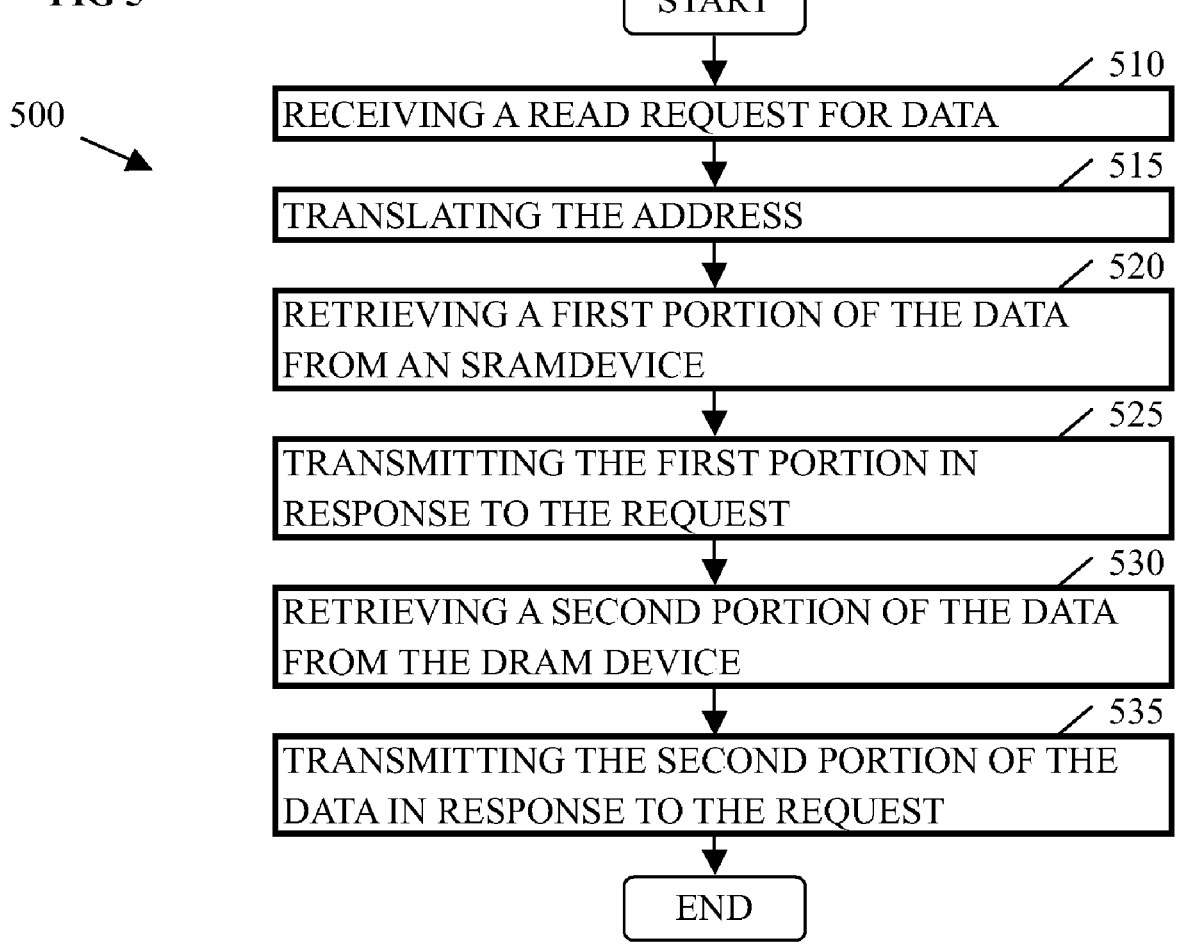

METHODS AND ARRANGEMENTS FOR HYBRID DATA STORAGE

FIELD

The present disclosure relates generally to data storage devices. More particularly, the present disclosure relates to methods and arrangements for hybrid data storage to balance low latency accesses with high-density data storage.

BACKGROUND

Memory bottlenecks are significant issues with respect to speed and processing capacity of modern computer systems. Manufacturers continue to increase processor clock speeds, bus speeds and widths, and memory sizes to improve system performance, but the processor cannot execute commands any faster than the memory can access the commands to transmit the commands to the processor. Thus, if the memory cannot be accessed as quickly as the processor can execute the commands, the processors will stall in spite of the increased clock and bus speeds and bus width, significantly impacting the system's overall performance.

Cache memories, or caches, are often used in many such systems to alleviate this problem and increase performance in a relatively cost-effective manner. Two main types of solid-state memories employed today are static random access memory (SRAM) and dynamic random access memory (DRAM). Conceptually, SRAM is implemented using a flip-flop as a storage device and DRAM is implemented using a capacitor as a storage device. SRAM is regarded as static because it does not need to be refreshed like DRAM. Leakage currents reduce charges stored by DRAM so DRAM needs to be refreshed periodically.

Both SRAM and DRAM offer random access capability and appear substantially identical to other system components, however, SRAM has a significantly lower, initial latency. For instance, SRAM may offer initial access times that are approximately ten times faster than the initial access times for DRAM. In addition, the cycle time for SRAM is much shorter than that of DRAM because SRAM does not need to pause between accesses. However, this lower, initial latency and shorter cycle time comes at the expense of a much lower storage density and much higher power dissipation. SRAM, for example, can have approximately ten times the power dissipation of DRAM. Furthermore, SRAM is significantly more expensive than DRAM, e.g., approximately ten times more expensive per bit.

The decision between implementation of SRAM or DRAM is usually a compromise between the speed requirements on one side and the storage density, physical space, power constraints, and the cost, on the other. In general, SRAM is implemented in systems for which access speed outweighs other considerations such as for cache memories and DRAM is implemented in systems for which high storage density outweighs other considerations such as main memory systems.

At present, computer systems, from servers to low-power embedded processors, typically incorporate SRAM as a first level cache L1 and often as second and third levels of cache, L2 and L3. L1 and L2 cache memory are typically incorporated on the die of or near a processor, enabling storage of frequently accessed data and instructions close to the execution units of the processor to minimize access latency. Ideally, as the time for execution of an instruction nears, the instruction and corresponding data are moved to the L2 cache from the more distant, main memory or L3 cache. Incorporation of SRAM as cache, however, sacrifices higher density storage.

Computer systems also incorporate DRAM as the main memory. The main memory acts as a buffer for data and instructions accessed from even higher latency, large capacity or bulk storage devices such as hard drives, compact disks, remote systems, or the like. While many improvements have increased data bursting speeds from DRAM devices, the initial latencies can be very large so incorporation of DRAM for the main memory sacrifices lower initial access times for higher density storage, which can significantly impact the overall system performance.

SUMMARY OF THE INVENTION

The problems identified above are in large part addressed by methods and arrangements provided herein to collect data from a system in response to an event. One embodiment comprises a method to access data in memory. The method may involve identifying, by a memory controller, a first portion of the data associated with a write request; storing, by the memory controller, the first portion of the data in a first memory device; and storing, by the memory controller, a second portion of the data in a second memory device. The first memory device has an initial access latency that is shorter than an initial access latency of the second memory device and memory locations of the first portion and the second portion have consecutive memory addresses. The method may also involve receiving a read request for the data; accessing, by the memory controller, the first memory device to retrieve the first portion of the data; accessing, by the memory controller, the second memory device to retrieve a second portion of the data during the and accessing of the first memory device. The method may then transmit the first and second portions of the data in response to the read request.

Another embodiment comprises an apparatus to access data. The apparatus may comprise a first type of memory device; a second type of memory device; and a memory controller coupled with the first type of memory device and the second type of memory device. The memory controller is to be responsive to a write request to write data associated with the write request to the first type of memory device and the second type of memory device. The memory controller is also responsive to a read request for the data to read a first portion of the data from the first type of memory device during an initial latency associated with access to a second portion of the data in the second type of memory device, to read the second portion of the data in the second type of memory device during the read of the first portion of the data from the first type of memory device, and to transmit the first and second portions of the data in response to the read request. The memory locations for the first portion of the data and the second portion of the data are assigned consecutive memory addresses.

Another embodiment includes a system. The system may comprise a processor; a static random access memory (SRAM) device; a dynamic random access memory (DRAM) device; and a memory controller coupled with the processor via a bus. The memory controller may store data of a write request from the processor in the SRAM and DRAM devices and may comprise logic to split the data into at least a first portion to store in the SRAM device and a second portion to store in the DRAM device In response to a read request for the data, the memory controller may read the first portion of the data from the SRAM device and read the second portion of the data from the DRAM device during the read of the first portion of the data from the SRAM device. The memory controller may also transmit the first and second portions of the data in response to the read request. Memory locations of the first portion and the second portion have consecutive memory addresses.

Yet another embodiment includes a device to couple with a memory controller. The device may comprise a first memory device with a low initial access latency; a second memory device with a high initial access latency; and address-decoding logic interconnected with the first memory device and the second memory device. The address-decoding logic may associate a first, consecutive physical address range with the first memory device and a second, consecutive physical address range with the second memory device, wherein the first, consecutive physical address range is consecutive with the second, consecutive physical address range. Furthermore, the address-decoding logic is responsive to a write command to write data from the memory controller to the memory devices. The address-decoding logic may decode an address of the write command to write a first portion of the data to the first memory device and a second portion of the data to the second memory device. The address-decoding logic is also responsive to a read command for the data from the memory controller to decode an address of the read command to read the first portion of the data from the first memory device and to read the second portion of the data from the second memory device, to transmit the data to the memory controller.

BRIEF DESCRIPTION OF THE DRAWINGS

Aspects of the invention will become apparent upon reading the following detailed description and upon reference to the accompanying drawings in which like references may indicate similar elements:

FIG. 1 depicts a processing system comprising hybrid memory controllers and hybrid memory devices;

FIG. 2 depicts a timing diagram for response to a read request from a hybrid memory device;

FIG. 4 illustrates a flow chart of an embodiment to respond to a write request via a hybrid memory controller; and FIG. 5 illustrates a flow chart of an embodiment to respond to a read request to retrieve data via a hybrid memory controller.

DETAILED DESCRIPTION OF EMBODIMENTS

Figure 3A:
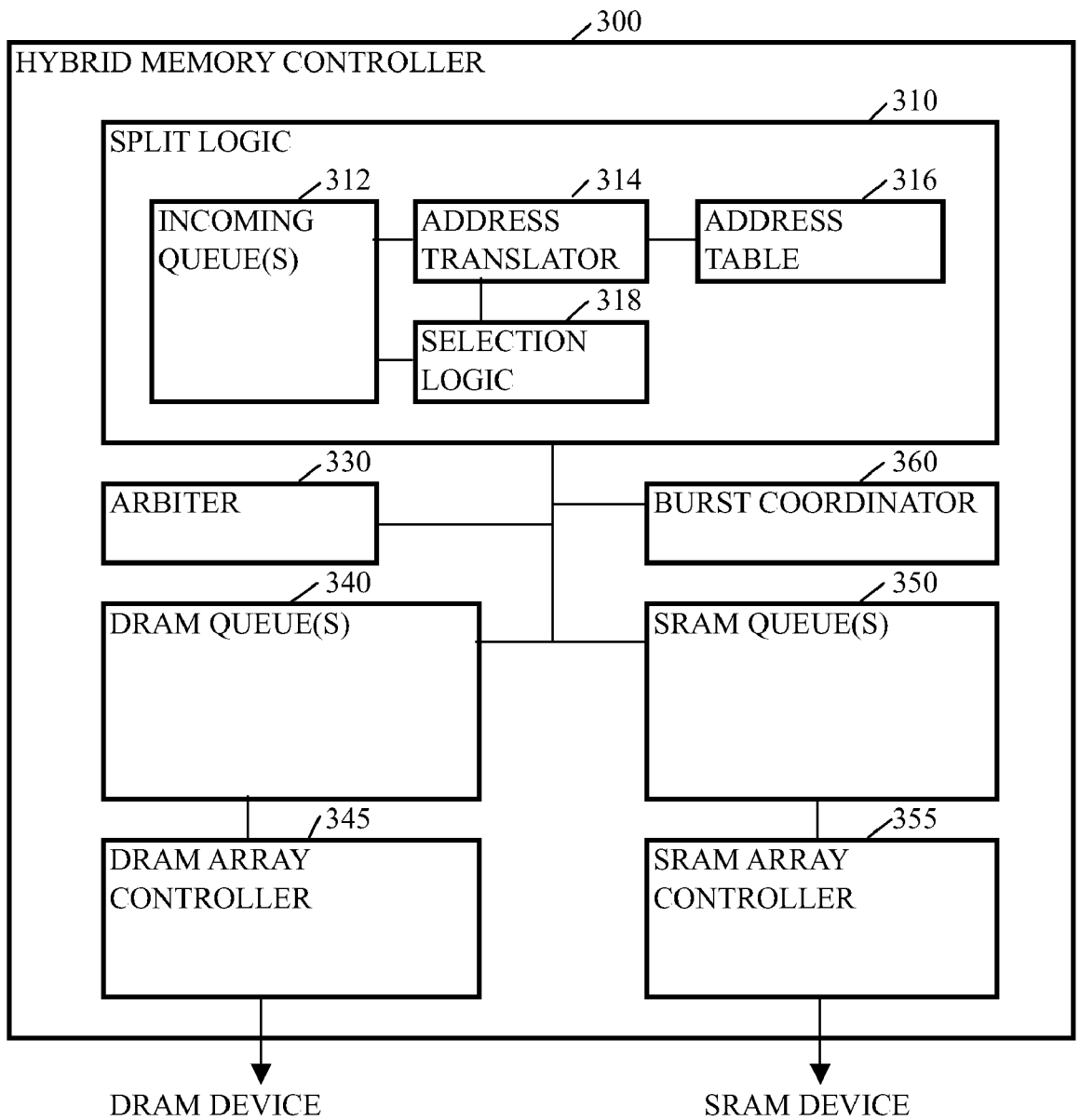
FIG. 3A illustrates a hybrid memory controller comprising logic to access static random access memory (SRAM) and dynamic random access memory (DRAM) to reduce or substantially hide the initial latency of access to data stored in the DRAM.

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements for hybrid data storage for a processing system are described herein. Embodiments may comprise a hybrid memory controller to facilitate accesses of hybrid memory, i.e., more than one type of memory device. For convenience, the hybrid memory is referred to below generally as a hybrid memory device and sometimes more specifically as a hybrid cache device, which is indicative of the role of the memory in the system. A hybrid memory device may be a device specifically designed to assign consecutive addresses to the hybrid memory or loosely coupled memory devices at a common location or in various locations of the processing system.

The hybrid memory controller may include split logic to determine whether to split data of a write request into more than one portion and to store each portion in a different type of data storage device. For example, one embodiment comprises a hybrid memory controller to store data in both SRAM and DRAM devices. The SRAM and DRAM devices may include distinct circuits on a die, distinct dies within a chip, distinct chips on a memory module, distinct memory modules, or the like.

The hybrid memory controller may be one or more chips and may comprise memory array controllers for each type of memory device such as an array controller for an SRAM device and an array controller for a DRAM device. Furthermore, the hybrid memory controller may comprise an address translator and an address table to track portions of data split between more than one memory devices and, in some embodiments, assign consecutive, logical addresses to the data split between more than one memory devices.

Further embodiments comprise a hybrid memory device with address-decoding logic to associate consecutive addresses with more than one types of memory. The hybrid memory device may include more than one types of memory interleaved and coupled with address-decoding logic. The address-decoding logic may assign consecutive addresses to the different types of memory to substantially hide an initial access latency associated with high initial access latency memory devices such as DRAM. For instance, the a first portion of data received with a write request may be written to a low initial access latency memory device such as SRAM and the remainder of the data may be written in consecutive memory addresses of the high initial access latency memory device. In many embodiments, the hybrid memory device may replace contemporary memory modules without implementation of special logic in the corresponding memory controller.

While specific embodiments will be described below with reference to specific memory devices, circuits, queue configurations, or logic configurations, those of skill in the art will realize that embodiments of the present disclosure may advantageously be implemented with other memory devices, circuits, queue configurations, and logic configurations.

Turning now to FIG. 1, there is shown a processing system 100 comprising hybrid memory controllers such as hybrid cache controller 120, hybrid video memory controller 140, cache controller 155, and hybrid memory controller 165, to access hybrid memory devices such as hybrid level two (L2) cache 125, hybrid level three (L3) cache 160, hybrid video memory 145, and hybrid system memory 170. Processing system 100 may be a computer system such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing or transmitting information. Similar embodiments are implemented as, e.g., entertainment devices such as a portable music player or a portable video player, a smart phone or other cellular phone, a telephone, a digital video camera, a digital still camera, an external storage device, or the like. Further embodiments implement larger scale server configurations such as server systems.

Processing system 100 comprises components such as a processor 105 coupled with a memory controller hub (MCH) 135 and input-output (I/O) controller hub (ICH) 150 via a host bus 130, a video controller 137, memory controllers, and memory mounted on the planar such as a motherboard. Processing system 100 comprises components such as processor 105, which comprises a processor core 110 coupled with a hybrid cache controller 120 and a hybrid level two (L2) cache 125. Processor 105 may be an International Business Machines PowerPC® processor, Intel® Pentium® processor, Cyrix processor or Advanced Micro Devices 8486 processor or any other suitable processor. In further embodiments, processor 105 may be one of multiple processors coupled with host bus 130. In many embodiments, level one (L1) cache may be incorporated into processor core 110.

Hybrid memory devices may provide fine granularity to balance between low latency memory and bulk memory and, in some embodiments, even an adjustable granularity after deployment. For instance, hybrid L2 cache 125 may comprise predominantly low latency memory 126 for data storage such as static random access memory (SRAM) devices to provide low latency access. However, hybrid L2 cache 125 may also include a bulk memory 127 such as dynamic random access memory (DRAM) devices to increase the amount of data that can be stored at a relatively lower cost per byte, a lower power consumption level, and/or a relatively higher density to reduce the impact on the silicon area on the die of processor 105. The SRAM and DRAM devices may include distinct circuits on a die, distinct dies within a chip, distinct chips on a memory module, distinct memory modules, or the like.

Hybrid cache controller 120 may offer cache algorithms and other such functionality along with low latency access to instructions and data for processor core 110. Furthermore, hybrid cache controller 120, may include split logic that divides write data into portions to store in low latency memory 126 and bulk memory 127, tracks the portions of the data, and retrieves the portions of the data from both low latency memory 126 and bulk memory 127. In some embodiments, hybrid cache controller 120 may be designed to split the data into predefined portions based upon anticipated or heuristically determined sizes for data reads. In many embodiments, the predefined portions vary based upon the application(s) executing on processing system 100. For instance, servers execute different applications than desktop computers and may operate more efficiently when larger sizes of data are accessed, on average, per read request to hybrid L2 cache 125. Thus, in some server embodiments, the size of the portion stored in bulk memory 127 may be larger, on average, than corresponding portions for desktop embodiments.

The predefined portion of low latency memory 126 may be defined based upon the amount of data that can be read from low latency memory 126 while bulk memory 127 is preparing to burst the remainder of the data. In many embodiments, this portion accounts for the initial latency associated with low latency memory 126 as well as the initial latency associated with access to bulk memory 127. Thus, the predefined portion of low latency memory 126 may substantially hide the high initial access latency of the bulk memory 127.

The predefined portion of bulk memory 127 may be determined based upon the amount of data anticipated for a typical, mean, or average read request and the predefined portion of low latency memory 126. In other embodiments, the predefined portion of bulk memory 127 may be determined based upon the expected maximum, typical maximum, or mean maximum size of a read request. In several embodiments, the ratio of low latency memory 126 to bulk memory 127, e.g., SRAM to DRAM, in hybrid L2 cache 125 is determined based upon these predefined portions. In further embodiments, hybrid cache controller 120 may be designed to learn or refine the size of the portions to place in low latency memory 126 and bulk memory 127 to meet one or more indicated or predefined goals. In such embodiments, the ratio may be primarily based upon other factors.

In response to a read request from processor core 110, hybrid cache controller 120 may read data from low latency memory 126 first to return data to processor core 110 quickly. Around the time hybrid cache controller 120 initiates access to the portion of the data in low latency memory 126, hybrid cache controller 120 may initiate a read of the portion of the data stored in bulk memory 127. Hybrid cache controller 120 may then respond to processor core 110 with the portion of the data retrieved from low latency memory 126 followed by the portion of the data retrieved from bulk memory 127 in one substantially continual burst or two distinct bursts. In some embodiments, the burst speed for data from bulk memory 127 is comparable to or substantially the same as the burst speed of low latency memory 126 but the initial latency of low latency memory 126 is lower than the initial latency of bulk memory 127.

MCH 135 and ICH 150 represent part of processing system's 100 core logic chipset, facilitating access to/from processor 105 from/to memory devices and I/O devices, respectively. MCH 135 may include a bus 149 adapted for direct memory access (DMA) by video controller 137. In some embodiments the bus 149 may be an accelerated graphics port (AGP). The AGP may be a high-speed port that is designed for video controller 137 and may provide a direct communications between video controller 137 and hybrid system memory 170. AGP may use, e.g., a 32-bit bus to provide data transfer rates such as 264 Megabytes per second, 528 Megabytes per second, one Gigabyte per second, and two Gigabytes per second. In other embodiments, bus 149 may be a peripheral component interconnect (PCI) bus such as a PCI-Express (PCI-E) bus.

Video controller 137 may generate and refresh a display for processing system 100 such as a liquid crystal display (LCD). Video controller 137 may comprise a hybrid video memory controller 140 and a hybrid video memory 145. Hybrid video memory controller 140 may comprise a memory controller designed to split write data between one or more types of memory devices such as low latency memory 146 (e.g., a dual-ported SRAM) and bulk memory 147 (e.g., a VRAM, which is essentially a dual ported DRAM designed especially for video processing). Similar to hybrid cache controller 120, hybrid video memory controller 140 may divide data from write requests into portions to store in low latency memory 146 and bulk memory 127. However, the relative sizes of low latency memory 146 and bulk memory 147, as well as the relative sizes of the portions of the data stored in low latency memory 146 and bulk memory 147 may be based upon algorithms and functionality associated with video controller 137.

MCH 135 also provides access to level three (L3) cache 160 via a cache controller 155 and hybrid system memory 170 via a hybrid memory controller 165. Hybrid L3 cache 160 may store instructions and data repeatedly accessed by processor 105, including instructions and data that is not accessed often enough to be promoted to hybrid L2 cache

125. Hybrid L3 cache 160 comprises two types of memory devices, a low latency memory 162 and a bulk memory 163. In some embodiments, hybrid L3 cache 160 may comprise interleaved banks of low latency memory 162 and bulk memory 163. In other embodiments, hybrid L3 cache 160 may comprise one or more modules of low latency memory 162 and bulk memory 163.

Cache controller 155 is a standard memory controller designed to access L3 cache. When cache controller 155 writes to a consecutive address range in hybrid L3 cache 160, address-decoding logic 161 of hybrid L3 cache 160 may write a first portion of the data to low latency memory 162 and a second portion of the data to bulk memory 163. Thereafter, in response to a read request for that address range, address-decoding logic 161 may retrieve the first portion of data to burst an initial response to the read request. Substantially simultaneously, address-decoding logic 161 may retrieve the second portion of data from bulk memory 163 to burst the remainder of the response to the read request. In further embodiments, the operating system or other memory management code may be aware of hybrid L3 cache 160 and select addresses for storage of data in a manner to gain further advantages from the two memory types in hybrid L3 cache 160. In other embodiments, implementation of a hybrid memory controller for cache controller 155 may gain further advantages from hybrid L3 cache 160.

Hybrid system memory 170 may include low latency memory modules such as SRAM and bulk memory modules such as double data rate (DDR) synchronous dynamic random access memory (SDRAM). Hybrid system memory 170 is composed of one or more memory modules and hybrid memory controller 165 includes an address translator for mapping addresses to and from processor 105 to particular areas of hybrid system memory 170 such as areas within low latency memory 172 and areas within bulk memory 173.

Hybrid memory controller 165 may comprise split logic to determine whether to split write data into portions for storage in low latency memory 172 and bulk memory 173. For example, if the size of the write data does not meet or exceed a threshold size, then the split logic may store all of the data in bulk memory 173 or in low latency memory 172. For example, the threshold may be a size at which the bulk of the data would be stored in higher density, bulk memory 173 rather than in low latency memory 172. In several embodiments, the threshold is determined dynamically, while in further embodiments, the threshold, or at least a default threshold, is predefined. In some embodiments, the selection of write data to split between low latency memory 172 and bulk memory 173 may be based upon priorities associated with the data, a threshold size of for the data, the amount of space left in low latency memory 172, fragmentation of low latency memory 172 or bulk memory 173, and/or other factors.

ICH 150 is designed to coordinate communications with various I/O devices. For instance, ICH 150 may couple with a local area network (LAN) adapter, universal serial bus (USB) ports, a redundant array of independent disks (RAID) controller, an integrated drive electronics (IDE) bus, a PCI-E bus, PCI bus, and low pin count (LPC) bus. The LAN adapter can be coupled to either the PCI bus or directly to ICH 150 to facilitate communication with a remote computer or server over a LAN. The LAN adapter may also be known as a network interface card (NIC).

FIG. 2 depicts a timing diagram 200 for an embodiment of a response to a read request for data by a hybrid memory controller such as hybrid cache controller 120, hybrid video memory controller 140, and hybrid memory controller 165. In this embodiment, the hybrid memory controller bursts the first portion of the data 220 from SRAM 210 after an initial latency for SRAM 210, which is between t0 and tSRAM. After bursting the first portion of the data 220, the hybrid memory controller bursts a second portion of the data 260 from DRAM 250. The initial latency for bursting the second portion of the data 260 from DRAM 250 is between t0 and tDRAM.

In some cache embodiments, the first portion of the data 220 burst from SRAM 210 may be larger than the second portion of the data 260 burst from DRAM 250. However, in many system memory embodiments, the second portion of the data 260 burst from DRAM 250 is larger than the first portion of the data 220 burst from SRAM 210.

In a number of embodiments, the end of the burst of the first portion of the data may not be at the end of the initial latency period for DRAM 250 so the dashed lines 270 indicate a range of potential times at which the SRAM 210 burst may end. In several of these embodiments, the burst of the second portion of the data 260 may start at or after the end of the burst of the first portion of the data 220. In other embodiments, a pause may occur between the bursts or the bursts may overlap.

Referring to FIG. 3A, there is shown an embodiment of a hybrid memory controller 300 comprising a split logic 310 to access an SRAM device and a DRAM device to reduce or substantially hide the initial latency of access to data stored in the DRAM device. Hybrid memory controller 300 may include a microcontroller, a specific purpose system such as a state machine or specific purpose processor, a general purpose machine configured by code, combinations of the two, or the like. In particular, hybrid memory controller 300 may receive commands, also referred to as requests, to access hybrid memory such as read (or load) commands and write (or store) commands. In some embodiments, hybrid memory controller 300 may re-order the commands based upon latencies associated with servicing the commands and priorities associated with the commands, to reduce latencies involved with accessing memory. Hybrid memory controller 300 includes split logic 310, an arbiter 330, DRAM queue(s) 340 coupled with DRAM array controller 345, and SRAM queue(s) 350 coupled with SRAM array controller 355. Hybrid memory controller 300 may also include a burst coordinator 360.

Split logic 310 may receive incoming commands from a requester, e.g., a processor such as processor 105 in FIG. 1 and respond to the commands with data or transaction acknowledgements. For example, split logic 310 may process read commands and respond by returning the data to the requester. Split logic 310 may process write commands by storing the data associated with the write commands in the DRAM device and/or SRAM device and respond to the requester with a completion to acknowledge that the data has been written or is in the process of being written to the DRAM device and/or SRAM device.

Split logic 310 may comprise incoming queue(s) 312, an address translator 314, an address table 316, and selection logic 318. Incoming queue(s) 312 may comprise one or more queues within which to store commands to be processed. In some embodiments, incoming queue(s) 312 may comprise a single queue that receives all incoming commands. Split logic 310 may then separate the commands into a read command queue and a write command queue. In further embodiments, incoming queue(s) 312 may have a second stage comprising one or more queues to maintain processed commands until arbiter 330 transmits the commands to DRAM queue(s) 340 or SRAM queue(s) 350.

Address translator 314 translates the address targeted by commands received by split logic 310. In particular, a physical (or real) address is appended or otherwise associated with incoming commands based upon address indications of the commands. Address translator 314 couples with address table 316 to convert the logical address indications of the commands into physical addresses that describe the memory extent(s) and bank(s) for which the commands are intended to perform an operation. For read commands, if the data is split between the DRAM device and the SRAM device, address translator 314 may return a physical address for the DRAM device and a physical address for the SRAM device and associate those physical addresses with consecutive logical addresses in address table 316. In further embodiments, physical addresses within the SRAM device and the DRAM device may be associated in other ways such as physical associations or predetermined logical associations. Operations may include, for instance, loading data from the memory location or writing data to the memory location. In many embodiments, address translator 314 also verifies that the memory addresses associated with the commands are valid addresses.

Selection logic 318 may identify write commands for which data will be split into portions to store in the SRAM device and the DRAM device. In some embodiments, selection logic 318 may determine whether the data is suitable for division into the first and second portions. For instance, selection logic 318 may comprise a default or predefined threshold size for the data. In such embodiments, if the data associated with a write command meets or exceeds the threshold size, the data may be split.

In some embodiments, selection logic 318 may split data based upon a priority associated with the write command. For instance, the command may include an indication to split the data or may comprise an indication of a priority level associated with the data. In such situations, selection logic 318 may split the data based upon the indication or split the data if sufficient space is available in, e.g., the SRAM device based upon the priority. In many of these embodiments, an allocation may be provided for some or each of the priority levels and selection logic 318 may split the data if sufficient space is available.

In several embodiments, selection logic 318 may also determine the size of a first portion of the data to store in the SRAM device. Selection logic 318 may determine the size based upon the amount of data associated with the write command, a priority associated with the data of the write command, an amount of space available for the data based upon a priority associated with the data, an amount of space available within the SRAM device, a heuristically determined size, a predetermined size, a default size, or the like.

Selection logic 318 may associate an indication of the decision to split or not with the write command, as well as possibly the size of the first portion of the data, and address translator 314 may associate one or more physical addresses with the write command accordingly. In one embodiment, the size of the first portion of the data is predefined to be a size that can be burst during the initial latency associated with bursting the second portion of the data from the DRAM device. In such embodiments, address translator 314 may assign addresses to write commands based upon an indication from selection logic 318 regarding whether the data associated with the write command meets or exceeds a threshold size.

Arbiter 330 may transfer commands from incoming queue(s) 312 to corresponding DRAM queue(s) 340 and/or SRAM queue(s) 350 after the commands are assigned physical addresses by address translator 314. In some embodiments, arbiter 330 may transmit a command to DRAM queue(s) 340 when space becomes available within the DRAM queue(s) 340 to receive the command. Similarly, arbiter 330 may transmit a command to SRAM queue(s) 350 when space becomes available.

DRAM queue(s) 340 may comprise one or more queues such as first in, first out (FIFO) queues. In some embodiments, DRAM queue(s) 340 may include logic to fast track some commands based upon priority or the nature of the command. For example, read commands may be performed prior to write commands at least until the number of pending write commands reaches a threshold number. In many embodiments, DRAM queue(s) 340 may comprise separate queues for read commands and write commands. In such embodiments, DRAM queue(s) 340 may comprise logic to compare addresses associated with reads and writes to assure that a read is not processed prior to a previously received write to the same address.

DRAM queue(s) 340 couples with DRAM array controller 345 to access DRAM banks of the DRAM device to read data from or write data to the banks. DRAM array controller 345 may comprise one or more sequencers to access the DRAM device.

SRAM queue(s) 350 may comprise one or more queues and, similar to DRAM queue(s) 340, some embodiments provide SRAM queue(s) 350 with logic to fast track some commands based upon priority or the nature of the command. In many embodiments, SRAM queue(s) 350 may comprise separate queues for read commands and write commands. In such embodiments, SRAM queue(s) 350 may comprise logic to compare addresses associated with reads and writes to assure that a read is not processed prior to a previously received write to the same address. SRAM queue(s) 350 couples with SRAM array controller 355 to access the SRAM device.

Burst coordinator 360 may coordinate bursts of data read from the DRAM device and the SRAM device to return the data in a single response to a read command or as a series of packets associated with the same response. In some embodiments, burst coordinator 360 may dynamically affect priorities of commands in queues to coordinate a response to a request. In further embodiments, burst coordinator 360 may include a buffer to facilitate coordination of a response to a read command, wherein a first portion of the data for the response is stored in the SRAM device and a second portion of the data is stored in the DRAM device.

Figure 3B:
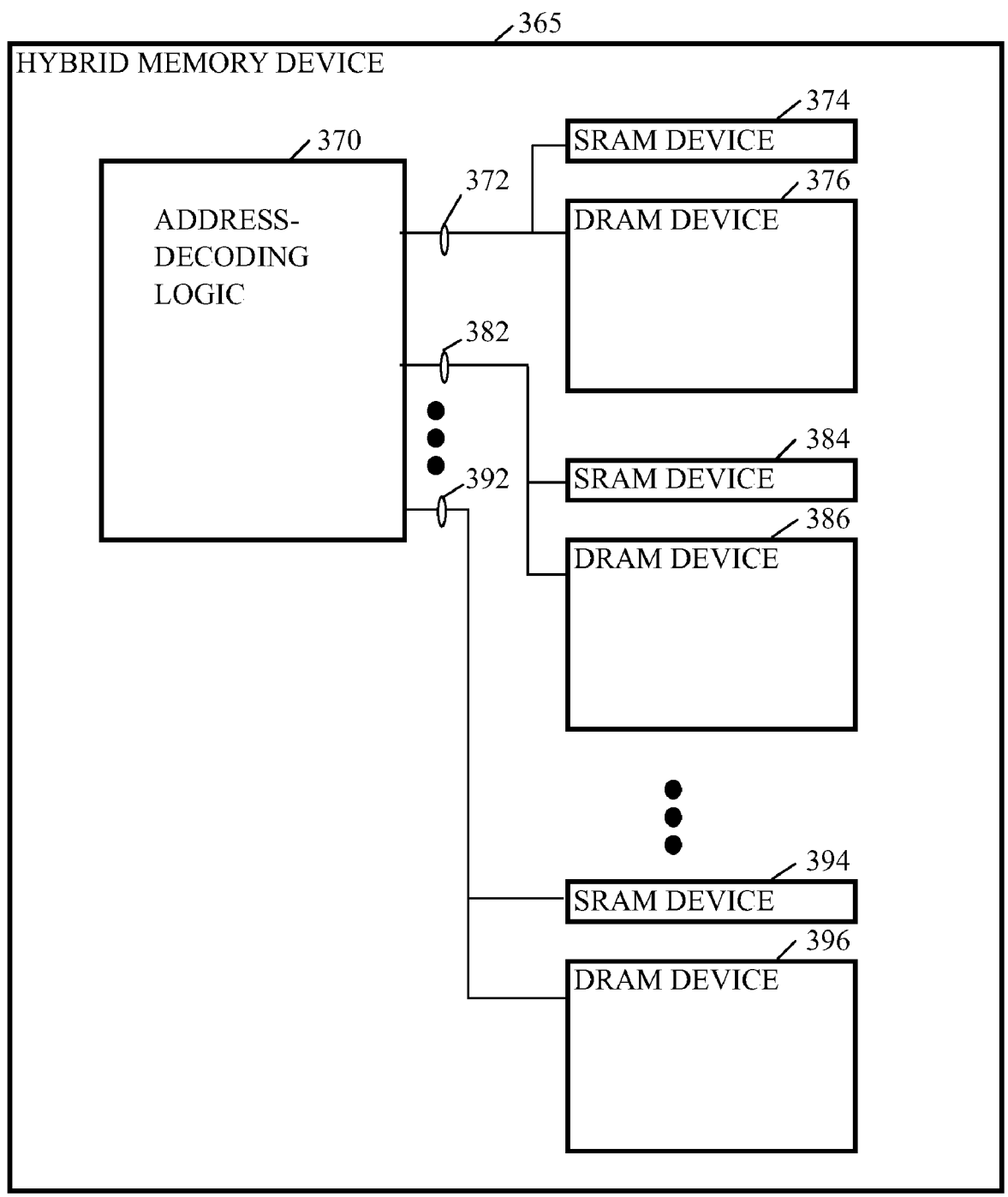
FIG. 3B depicts an embodiment of hybrid memory device comprising address-decoding logic interconnected with SRAM devices and DRAM devices to provide consecutive physical addresses for groups of the SRAM and DRAM devices.

FIG. 3B depicts an embodiment of a hybrid memory device 365 such as a hybrid memory device that might couple with hybrid memory controller 300 in FIG. 3A. Hybrid memory device 365 may comprise address-decoding logic 370 interconnected with SRAM devices 374, 384, and 394, and DRAM devices 376, 386, and 396, to provide consecutive physical addresses for groups of the SRAM and DRAM devices to reduce or substantially hide the initial latency of access to data stored in the DRAM devices. One alternative embodiment utilizes logical address assignments to provide consecutive memory addresses. Other embodiments may comprise a memory device with a fast initial access other than an SRAM device and/or a memory device with a slow initial access other than a DRAM device. Further embodiments comprise combinations of more than two types of memory devices, wherein each combination is assigned a range of consecutive memory addresses.

Address-decoding logic 370 may be a higher-level logic to associate physical addresses with modules or chips, and/or may provide a lower-level address-decoding for extents and banks. Address-decoding logic 370 is interconnected with, e.g., SRAM device 374 and the DRAM device 376 via connection 372 to associate a first, consecutive physical address range for SRAM device 374 and a second, consecutive physical address range for DRAM device 376. In many embodiments, the first, consecutive physical address range is consecutive with the second, consecutive physical address range.

Similarly, address-decoding logic 370 couples with SRAM device 384 and DRAM device 386 via connection 382 and couples with SRAM device 394 and DRAM device 396 via connection 392. Connections 372, 382, and 392 may each comprise a line in some embodiments, or a bus in other embodiments.

SRAM devices 374, 384, and 394 may each comprise a bank, an extent, a group of banks, a die, a chip, a group of chips, a module, a group of modules, or the like of SRAM. Similarly, DRAM devices 376, 386, and 396 may each comprise a bank, an extent, a group of banks, a die, a chip, a group of chips, a module, a group of modules, or the like of DRAM. Furthermore, the group of SRAM device 374 and DRAM device 376, like the other groups of SRAM and DRAM, may comprise an extent, a group of banks, a die, a chip, a group of chips, a module, a group of modules, or the like of a combination of SRAM and DRAM. For example, the SRAM device 374 may be a first die of SRAM, the DRAM device 376 may be a second die of DRAM, and, in some embodiments, the dies may reside in a single chip package.

FIG. 4 illustrates a flow chart 400 of an embodiment to respond to a write request via a hybrid memory controller. Flow chart 400 begins with receiving a write request (element 410). For example, the hybrid memory controller may receive a transaction from a processor comprising a write request with an address indication and the data to write. In some embodiments, the processor may be a general processor for a processing system such as processor 105 of processing system 100. In further embodiments, the processor may be a video processor on a video or graphics card and the hybrid memory controller may be a video memory controller for memory mounted on the video card.

A decision is then made regarding whether to split the data of the write request into portions to store in a lower initial latency device such as SRAM and a higher initial latency device such as extended data out (EDO) DRAM (element 415). In some embodiments, more than two types of memory devices may be available and the selection of the number and types of devices within which the data is written may depend upon the amount and nature of the data to write. For instance, a large amount of data that the processor will periodically execute or manipulate may be given a high priority and written to more than two devices to increase the effective bandwidth of the hybrid memory device. On the other hand, a smaller amount of data with a lower priority may be written into one or two memory devices.

If the hybrid memory controller determines that the data will not be split into portions, the data may be transmitted to a selected memory device for storage (element 420) and an address indication may be stored in an address table to facilitate retrieval of the data in response to a subsequent read request (element 450). If the hybrid memory controller determines that the data will be split into portions, a first portion of the data may be transmitted to a low latency memory device for storage (element 440) and a second portion of the data may be transmitted to a higher initial latency memory device for storage (element 445). The first and second portions of the data may then be written to the corresponding memory devices as the devices become available to write the data and address location indications for the data may be stored in an address table and associated with consecutive logical addresses to facilitate retrieval for a subsequent read request (element 450).

FIG. 5 illustrates a flow chart 500 of an embodiment to respond to a read request to retrieve data via a hybrid memory controller. The method begins by receiving a read request for data (element 510). The read request may comprise a logical address to indicate the data to read from memory. The hybrid memory controller may then translate the logical address (element 515) to determine a physical address within an SRAM device for a first portion of the data and a physical address within a DRAM device for a second portion of the data.

In response to determining the address for the first portion of the data, the hybrid memory controller may retrieve the first portion of the data for preparing a response to the read request from the SRAM device (element 520) and transmit the response to the requester associated with the read request (element 525).

In response to determining the address for the second portion of the data within the DRAM device, the hybrid memory controller may retrieve the second portion of the data (element 530) and transmit the second portion of the data in response to the read request (element 535). In many embodiments, the amount of data stored in the SRAM device may be determined to be approximately the amount necessary to substantially hide the initial latency involved with bursting the second portion of the data from the DRAM device.

Another embodiment of the invention is implemented as a program product for implementing data collection logic such as systems and methods described with reference to FIGS. 1-5. The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements for hybrid memory storage. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to store data in memory, the method comprising:
   identifying, by a memory controller, a first portion of the data associated with a write request;
   storing, by the memory controller, the first portion of the data in a first memory device;
   storing, by the memory controller, a second portion of the data in a second memory device, the first memory device having an initial access latency that is shorter than an initial access latency of the second memory device, wherein memory locations of the first portion and the second portion have consecutive memory addresses;
   receiving a read request for the data;
   accessing, by the memory controller, the first memory device to retrieve the first portion of the data;
   accessing, by the memory controller, the second memory device to retrieve a second portion of the data during the accessing of the first memory device; and
   transmitting the first and second portions of the data in response to the read request.

2. The method of claim 1, further comprising assigning the consecutive memory addresses as logical memory addresses for the memory locations of the first portion and the second portion of the data.

3. The method of claim 1, further comprising determining that the data of the write request is suitable for division into the first and second portions.

4. The method of claim 1, wherein identifying the first portion comprises identifying an amount of the data to store in the first memory device to substantially hide the initial latency of the responding with the second portion of the data from the second memory device.

5. The method of claim 1, wherein storing the first portion of the data comprises storing the first portion in a first chip, wherein storing the second portion comprises storing the second portion in a second chip.

6. The method of claim 1, wherein storing the first portion of the data comprises transmitting the first portion to a first queue for storage in static random access memory and storing the second portion of the data comprises transmitting the second portion to a second queue for storage in dynamic random access memory.

7. An apparatus to store data, the apparatus comprising:
   a first type of memory device;
   a second type of memory device; and
   a memory controller coupled with the first type of memory device and the second type of memory device, the memory controller to be responsive to a write request to write data associated with the write request to the first type of memory device and the second type of memory device and responsive to a read request for the data to read a first portion of the data from the first type of memory device during an initial latency associated with access to a second portion of the data in the second type of memory device, to read the second portion of the data in the second type of memory device during the read of the first portion of the data from the first type of memory device, and to transmit the first and second portions of the data in response to the read request, wherein memory locations for the first portion of the data and the second portion of the data are assigned consecutive memory addresses.

8. The apparatus of claim 7, wherein the first type of memory device comprises a static random access memory (SRAM) device and the second type of memory device comprises a dynamic random access memory (DRAM) device.

9. The apparatus of claim 7, wherein the first type of memory device and the second type of memory device comprise interleaved memory banks on a die.

10. The apparatus of claim 7, wherein memory controller comprises selection logic to identify the first portion of the data to store in the first type of memory device.

11. The apparatus of claim 7, wherein the memory controller comprises selection logic to determine whether to store the first portion of the data in the first type of memory device.

12. The apparatus of claim 11, wherein the selection logic comprises logic to determine to store the first portion of the data in the first type of memory device based upon a priority associated with the data.

13. A system for hybrid memory storage, the system comprising:
   a processor;
   a static random access memory (SRAM) device;
   a dynamic random access memory (DRAM) device; and
   a memory controller coupled with the processor via a bus to store data of a write request from the processor in the SRAM and DRAM devices, wherein the memory controller comprises logic to split the data into at least a first portion to store in the SRAM device and a second portion to store in the DRAM device, and, in response to a read request for the data, to read the first portion of the data from the SRAM device and to read the second portion of the data form the DRAM device during the read of the first portion of the data from the SRAM device, and to transmit the first and second portions of the data in response to the read request, memory locations of the first portion and the second portion to have consecutive memory addresses.

14. The system of claim 13, wherein the SRAM device and the DRAM device are mounted on a memory module.

15. The system of claim 13, wherein the SRAM device comprises a first memory module and the DRAM device comprises a different memory module.

16. The system of claim 13, wherein the memory controller comprises a first memory controller to access the SRAM device and a second memory controller to access the DRAM device.

17. A device to couple with a memory controller, the device comprising:
   a first memory device with a low initial access latency;
   a second memory device with a high initial access latency; and
   address-decoding logic interconnected with the first memory device and the second memory device, the address-decoding logic to associate a first, consecutive physical address range with the first memory device and a second, consecutive physical address range with the second memory device, wherein the first, consecutive physical address range is consecutive with the second, consecutive physical address range, wherein the address-decoding logic is responsive to a write command to write data from the memory controller to the memory devices, the address-decoding logic to decode an address of the write command to write a first portion of the data to the first memory device and a second portion of the data to the second memory device, and the address-decoding logic is responsive to a read command for the data from the memory controller to decode an address of the read command to read the first portion of the data from the first memory device and to read the second portion of the data from the second memory device, to transmit the data to the memory controller.

18. The device of claim 17, wherein the first memory device comprises a bank of SRAM and the second memory device comprises one or more banks of DRAM.

19. The device of claim 17, wherein the first memory device comprises a first die and the second memory device comprises a second die.

* * * * *